(12) United States Patent
Hintermeister et al.

(10) Patent No.: US 7,996,773 B2
(45) Date of Patent: Aug. 9, 2011

(54) DISPLAYING AND MANAGING INHERITED VALUES

(75) Inventors: Gregory Richard Hintermeister, Rochester, MN (US); Michael D. Rahn, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 12/271,586

(22) Filed: Nov. 14, 2008

(65) Prior Publication Data

US 2009/0070680 A1  Mar. 12, 2009

Related U.S. Application Data

(63) Continuation of application No. 10/677,428, filed on Oct. 2, 2003, now Pat. No. 7,472,350.

(51) Int. Cl.
*G06F 15/177* (2006.01)
(52) U.S. Cl. .................. 715/736; 715/734; 715/738
(58) Field of Classification Search .................. 715/733, 715/734, 736, 738
See application file for complete search history.

(56) References Cited

U.S. PATENT DOCUMENTS

| | | | |
|---|---|---|---|
| 5,357,603 A | 10/1994 | Parker | |
| 5,437,025 A | 7/1995 | Bale et al. | |
| 5,615,362 A | 3/1997 | Jensen et al. | |
| 5,742,284 A | 4/1998 | Duggan et al. | |
| 5,761,669 A | 6/1998 | Montague et al. | |
| 5,848,243 A | 12/1998 | Kulkarni et al. | |
| 6,014,666 A | 1/2000 | Helland et al. | |
| 6,041,347 A | 3/2000 | Harsham et al. | |
| 6,047,288 A | 4/2000 | Kurosawa et al. | |
| 6,166,732 A | 12/2000 | Mitchell et al. | |
| 6,205,476 B1* | 3/2001 | Hayes, Jr. ..................... | 709/220 |
| 6,230,159 B1* | 5/2001 | Golde .................. | 1/1 |
| 6,247,020 B1 | 6/2001 | Minard | |
| 6,718,386 B1 | 4/2004 | Hanfland | |
| 6,792,611 B2 | 9/2004 | Honishi et al. | |
| 6,834,301 B1 | 12/2004 | Hanchett | |
| 6,947,959 B1* | 9/2005 | Gill .............................. | 715/202 |
| 7,073,137 B2 | 7/2006 | Hassanin et al. | |
| 7,076,736 B2 | 7/2006 | Hugh | |
| 7,430,715 B2* | 9/2008 | Sullivan et al. .............. | 715/255 |
| 2002/0091819 A1 | 7/2002 | Melchione et al. | |
| 2002/0196293 A1 | 12/2002 | Suppan et al. | |
| 2003/0197744 A1 | 10/2003 | Irvine | |
| 2003/0222918 A1 | 12/2003 | Coulthard | |
| 2004/0064802 A1 | 4/2004 | Cherdron et al. | |
| 2004/0239700 A1 | 12/2004 | Baschy | |
| 2005/0044058 A1* | 2/2005 | Matthews et al. ................. | 707/1 |

* cited by examiner

*Primary Examiner* — William L Bashore
*Assistant Examiner* — Gregory A Distefano
(74) *Attorney, Agent, or Firm* — Grant A. Johnson

(57) ABSTRACT

A method, system, and article of manufacture that help system administrators visualize the relationship between a global setting and the setting in each instance. One embodiment of the present invention comprises receiving a selection of a setting, determining an inheritance state for the selected setting, and displaying a graphical indication of the inheritance state of the selected setting. In some embodiments, the method further comprises displaying a graphical indication of the inheritance relationship between the selected setting and at least one related setting. The method may also include receiving a change inheritance relationship command, and changing the inheritance relationship for the selected setting.

18 Claims, 12 Drawing Sheets

DISPLAYING AND MANAGING INHERITED VALUES

CROSS REFERENCE TO RELATED APPLICATION

This is a continuation application of pending U.S. patent application Ser. No. 10/677,428, filed Oct. 2, 2003, entitled "Displaying and Managing Inherited Values," which is herein incorporated by reference.

TECHNICAL FIELD

This invention generally relates to system management systems and methods. More particularly, the present invention relates to an apparatus and computer program product for managing inherited settings.

BACKGROUND

The latter half of the twentieth century has been witness to a phenomenon known as the information revolution. While the information revolution is a historical development broader in scope than any one event or machine, one of its hallmarks has been the decreasing cost and increasing functionality of information technology ("IT"). This trend, in turn, has driven tremendous increases in productivity as product designs, manufacturing processes, resource scheduling, administrative chores, and many other tasks, are made more efficient. Today, as a result of this trend, virtually every organization relies heavily on information technology.

Many organizations have discovered that the total cost of information technology is not limited to the cost of the hardware and software used to perform its operations; it also includes the cost of human resources devoted to maintain and configure the IT systems. One particular problem faced by many of the administrators of these systems ("IT administrators") is that many of today's IT applications, such as web server programs, eCommerce application programs, virtual desktop programs, and server-based application programs, are designed to create multiple copies ("instances") of themselves, with each copy handling a specific task. These instances can all run on the same computer, or may be spread across multiple computers. Although this technique has many advantages, one problem is that each instance of the program must be maintained and properly configured.

One common method of managing of multiple instances of an application program is to create a file containing a global set of configuration choices ("settings"). New instances of an application can then copy ("inherit") their configuration settings from the so-called global configuration file. As a result of this technique, when an IT administrator changes a global setting, all new instances will automatically use the new value. One problem with this technique, however, is that IT administrators frequently need to override the global settings for a particular instance because that particular instance is used in a slightly different way. Another problem is that IT administrators may need to manage the settings of existing instances, rather than just the new instances. Those skilled in the art will appreciate that manually changing settings on a field-by-field basis across many instances of an application is a time consuming task even under the best circumstances.

One partial solution to this problem is to create multiple configuration files containing settings for the most common situations and uses. This technique, however, creates its own set of problems. For example, the IT administrator now needs to track what each configuration file does and which configuration file each instance uses. To further complicate matters, when an instance of an application is started, certain values can and should be overridden at run-time. When this occurs, the 'override' settings do not show up in any configuration file. As a result, IT administrators frequently cannot see from which configuration file a particular instance is inheriting when looking at that instance, or even see that a particular setting is inherited at all without performing a detailed and time-consuming investigation. These complications frequently force IT administrators to waste hours trying to determine where a configuration problem originates. As the Linux™ operating system and policy-based applications, such as eXtensible Markup Language ("XML") driven applications, become more popular, these problems will only increase in frequency.

Without a way to help IT administrators manage multiple instances of applications, the promise of the information revolution may never be fully achieved.

SUMMARY

The present invention provides a method, system, and article of manufacture that help system administrators visualize the relationship between a global setting and the setting in each instance. One aspect of the present invention is a method for managing settings in a computer system. One embodiment of this method comprises receiving a selection of a setting, determining an inheritance state for the selected setting, and displaying a graphical indication of the inheritance state of the selected setting. In some embodiments, the method further comprises displaying a graphical indication of the inheritance relationship between the selected setting and at least one related setting. The method may also include receiving a change inheritance relationship command, and changing the inheritance relationship for the selected setting.

Another aspect of the present invention is an inheritance manager for an IT system. One embodiment of the inheritance manager comprises a control widget associated with a selected setting, the control widget comprising an inheritance state indication and a current value for the selected setting, and an inheritance relationship indicator that indicates the inheritance relationship between the selected setting and at least one other setting. Some embodiments by further comprise a property widget associated with the at least one other setting, wherein the relative positions of the control widget and the property widget indicate an inheritance relationship between the selected setting and the at least one other setting. The control widget in some embodiments displays the current value using a control type used by a managed application to display the selected setting.

Other aspects of the present invention include a computer program product and a method for managing instances of an application in an IT system. One embodiment of the computer program product comprises a program configured to perform a method for managing settings in a computer system, and a signal bearing media bearing the program. The method for managing settings in this embodiment comprises receiving a setting selection, determining an inheritance state for the selected setting, and displaying a graphical indication of the inheritance state of the selected setting. One embodiment of the method for managing instances of an application in an IT system comprises launching an inheritance manager, selecting the control widget associated with a desired setting for an instance of the application, modifying the current value for the desired setting, and modifying the inheritance state for the desired setting. The inheritance manager in this embodiment comprises a control widget associated with a selected setting for one instance of an application, the control widget comprising an inheritance state indicator and a current value indicator, and an inheritance relationship indicator that indicates the inheritance relationship between the selected setting and at least one other setting;

DETAILED DESCRIPTION

Figure 1:
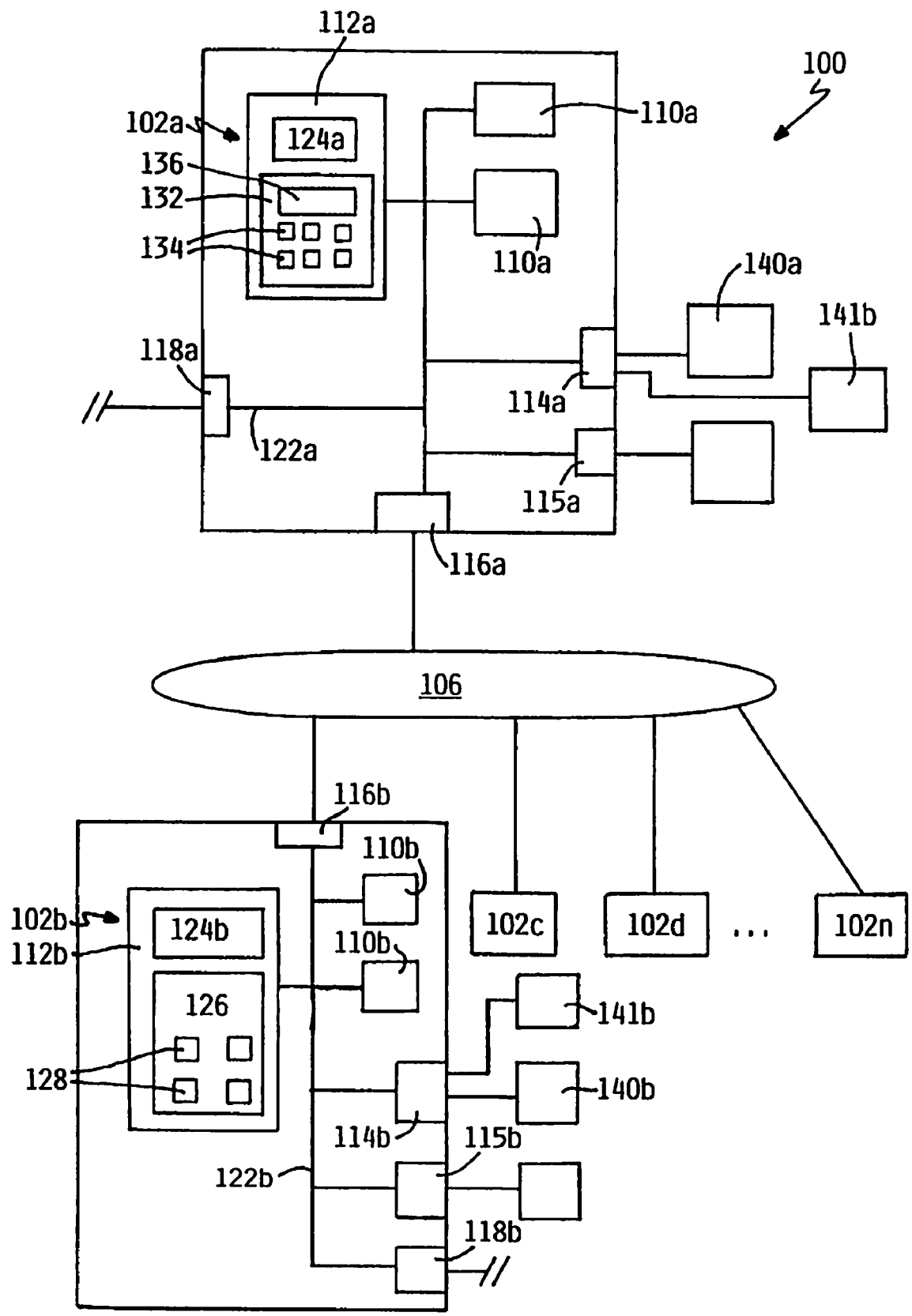
FIG. 1 illustrates one embodiment of an IT system.

FIG. 1 shows one embodiment an IT management system 100 comprising a management computer system 102a and a plurality of computer systems 102b-102n (only one shown in detail for clarity) that are managed by the management computer system 102a. Each computer system 102 has one or more central processing units 110 ("CPU") connected to a main memory 112, a mass storage interface 114, a display interface 115, a network interface 116, and an input/output ("I/O") interface 118 by a system bus 122. The mass storage interfaces 114 in the computer systems 102 connect the system busses 122 to one or more mass storage devices, such as a direct access storage device 140 and a readable and a writable optical disk drive 141. The network interfaces 116 allow the computer systems 102 to communicate with each other and to a plurality of other computers (not shown) over an appropriate communications medium 106. The main memory 112a in the management computer system 102a contains an operating system 124a and a configuration manager 132. The configuration manager 132, in turn, is capable of generating a plurality of control widgets 134 and an inheritance manager 136 in conjunction with the operating system 124a. The main memory 112b-112n in the managed computer systems 102b-102n contains an operating system 124b and one or more application program instances 126, such as web server application program, an eCommerce application program, a virtual desktop program, or the like, each of which has a plurality of associated settings 128.

In operation, each setting 128 of each application program instance 126 is uniquely associated with a control widget 134. The control widgets 134 provide the user of the management computer system 102a (typically the IT administrator) with a graphical summary of its setting's 128 current value and its inheritance status (e.g., currently inheriting, currently being inherited, etc). The inheritance manager 136, in turn, provides the user with a graphical indication of exactly how the each setting 128 interacts with other settings 128, and provides an interface that will allow the IT administrator to easily change each setting's 128 current value, inheritance properties, and inheritance interactions. That is, the inheritance manager 136 provides a graphical display that allows the IT administrator to manage inheritance relationships on a setting-by-setting basis. In some embodiments, the inheritance manager 136 will also show all related, but non-inheriting, settings 128. This feature is desirable because, by selecting a particular setting 128', the IT administrator can see those settings 128 that have an inheritance relationship with the selected setting 128' as well as any other logically-related settings 128 that do not currently have an inheritance relationship with the selected setting 128'.

FIGS. 2a-2e illustrates several control widgets 134 in accordance with one embodiment of the present invention. In general, the control widgets 134 may be any programmatic device that, alone or in combination with other programmatic devices, can receive and respond to input from a user input device, indicate the setting's current value and inheritance properties, and communicate with other applications (possibly another widget) by means of a call, for example. Each control widget 134 in this embodiment comprises a current value widget 202 and a graphical inheritance indicator 204. The current value widget 202 displays or graphically indicates the current value of the selected setting 128. Suitable control types (e.g., a table, radio button group, check box, etc.) include, without limitation, the control type typically used by the managed application 126 to control that particular type of setting 128, a control type common to the inheritance manager 136 or to the operating system 124, or another user-selected control type.

Figure 2A:
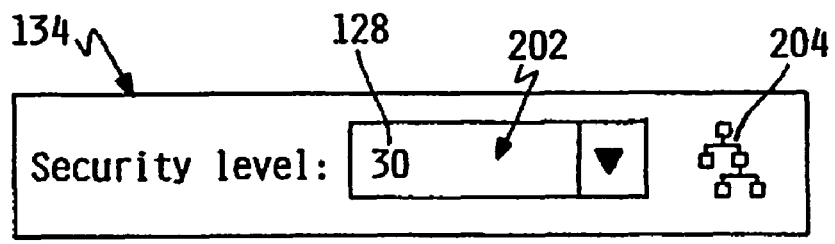
FIGS. 2a-2e illustrate several display widget embodiments.
Figure 2B:
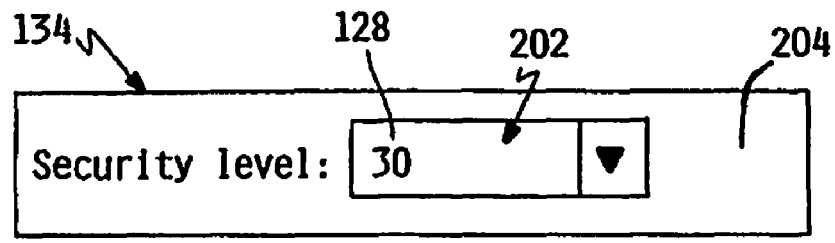
Figure 2C:
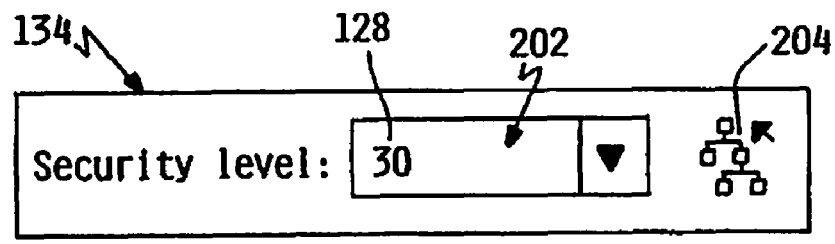
Figure 2D:
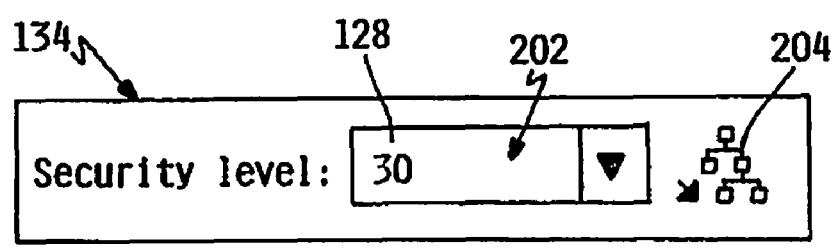
Figure 2E:
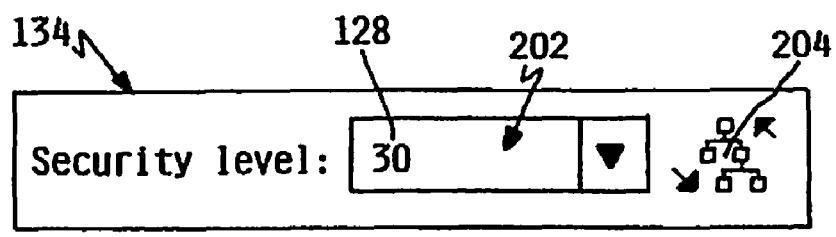

The inheritance indicator icon 204 graphically indicates the setting's current inheritance properties. The inheritance icon 204 in this embodiment comprises a superposition of two graphical elements. One graphical element, best shown in FIGS. 2a-2b, indicates: (i) that the associated setting 128' can inherit or be inherited (as shown in FIG. 2a); or (ii) that the associated setting 128' can neither inherit nor be inherited (as shown in FIG. 2b). The other graphical element, best shown in FIGS. 2c-2e, indicates: (i) that the associated setting 128' is currently inheriting from another application program instance 126 or configuration file (as shown in FIG. 2c); (ii) that another application program instance 126 is currently inheriting from the associated setting 128' (as shown in FIG. 2d); or (v) that the associated setting 128' is both inheriting from another application program instance 126 or configuration file, and is being inherited by another application program instance 126 (as shown in FIG. 2e). Those skilled in the art will appreciate that the particular graphical elements used by the inheritance manager 136 in FIGS. 2a-2e are merely illustrative, and that other graphical elements are within the scope of the present invention.

Figure 3A:
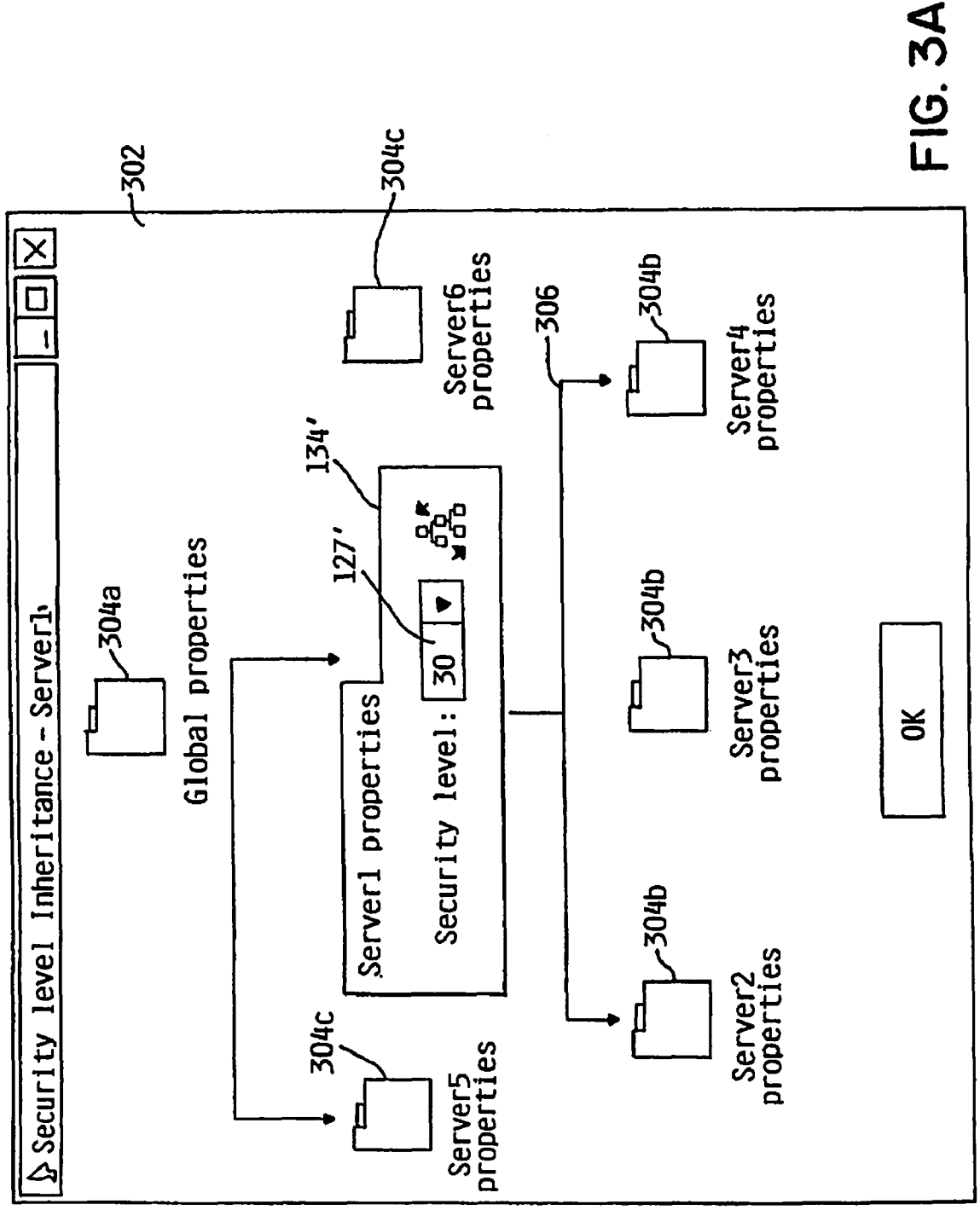
FIGS. 3a-3d illustrate one embodiment of an inheritance manager.
Figure 3B:
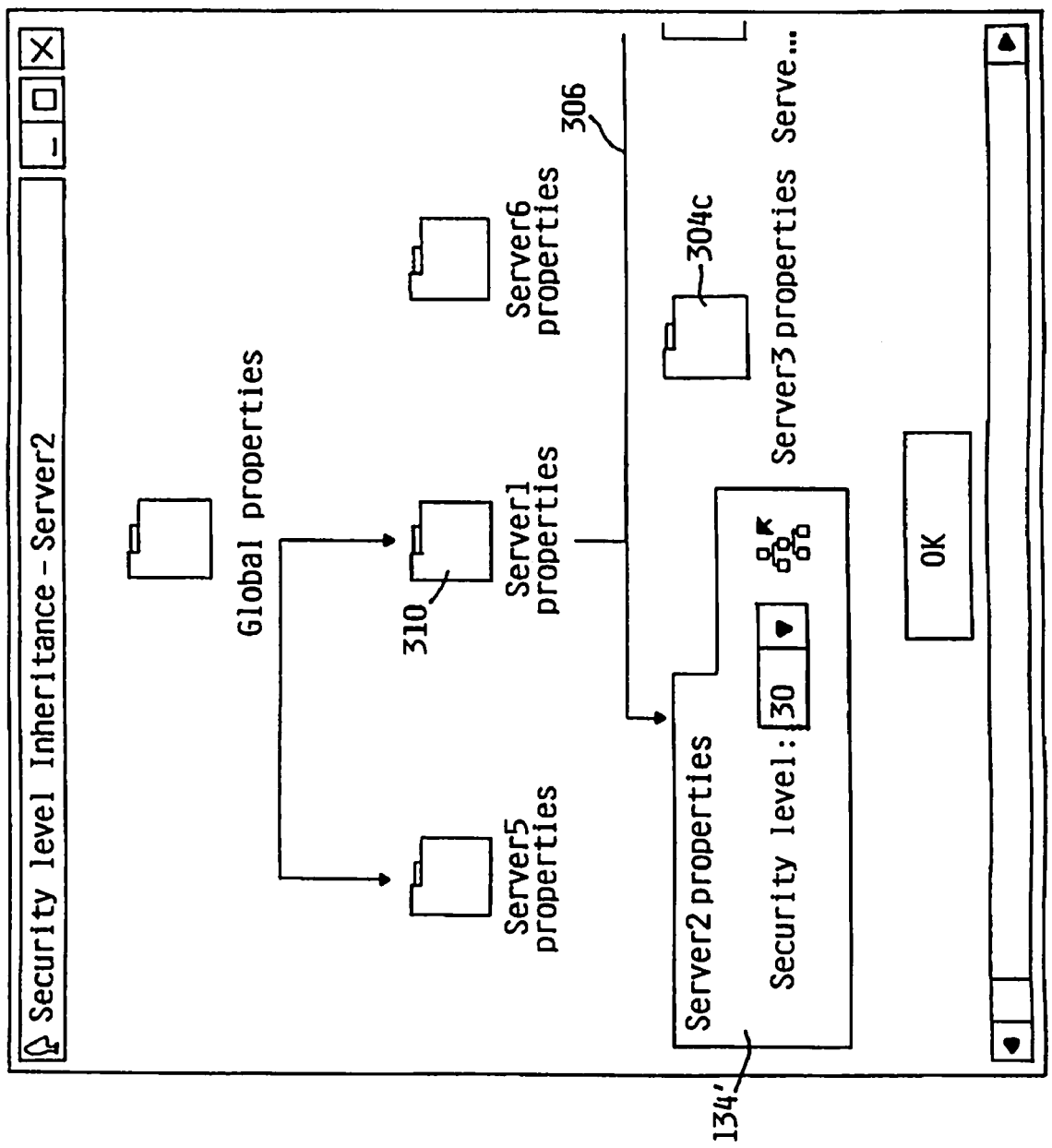
Figure 3C:
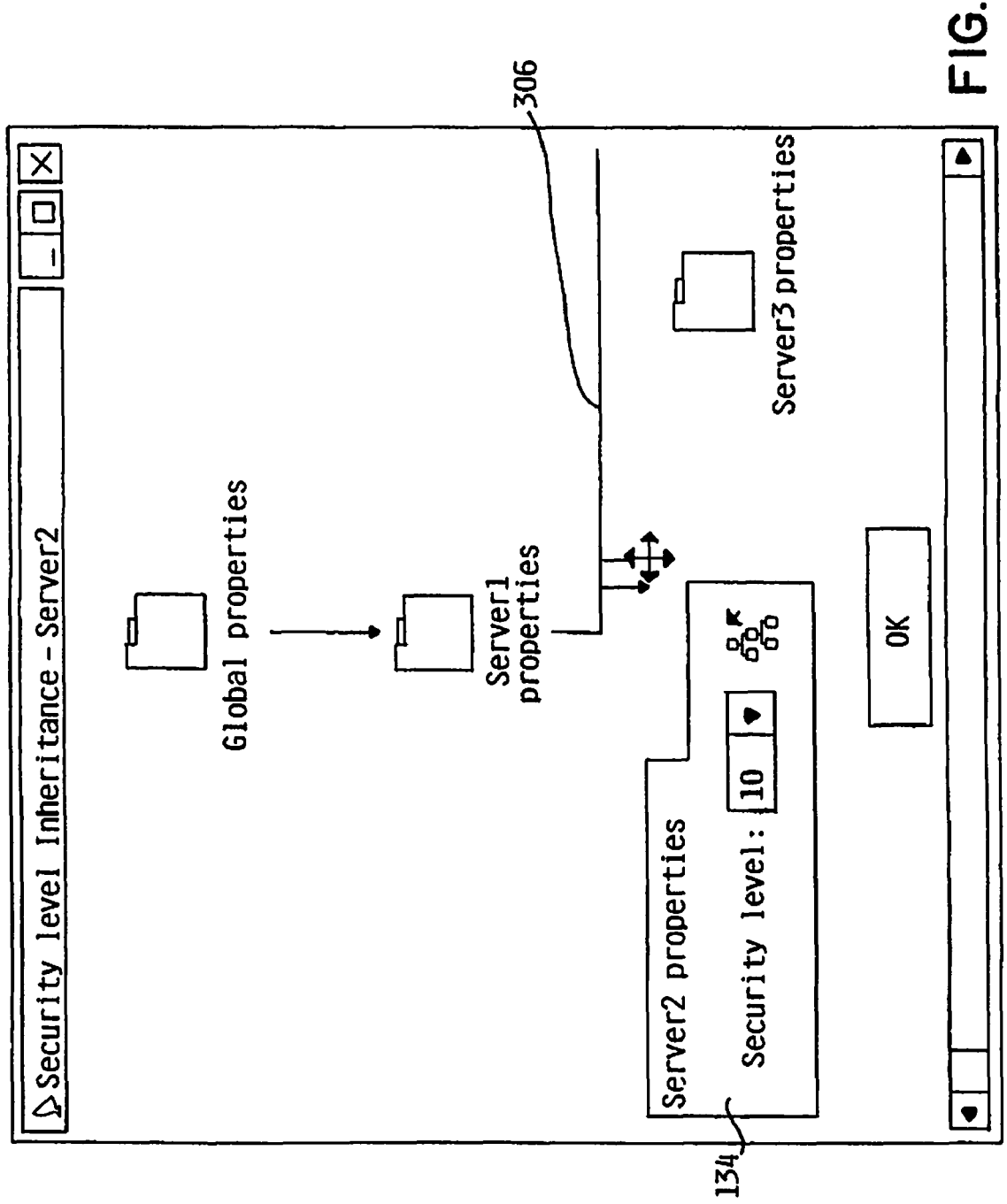

When a user selects one of the control widgets 134, for example by double-clicking, the configuration manager 132 causes the management computer 102a to display the inheritance manager 136. FIG. 3a-3c illustrate one embodiment of the inheritance manager 136. As best shown in FIG. 3a, the currently selected control widget 134' (i.e., the control widget 134 associated with the setting 128' in which the user is interested) is shown in the middle of an inheritance manager display pane 302. The control widget 124 in this embodiment uses the control type (e.g., a table, radio button group, check box, etc. . . . ) normally used by the associated application program 126 to display that setting 128', which is desirable because it provides the user with a uniform way to interact with that particular variable. Surrounding the currently selected control widget 134' are a plurality of related property widgets 304, each of which is associated with their own control widgets 134 (which, in turn, are associated with their own settings 128). The inheritance manager 132 in this embodiment displays 'above' the currently selected display widget 134' those property widgets 304a associated with settings 128 from which the currently selected setting 128' is inheriting. The inheritance manager 302 displays 'below' the currently selected widget 134' those the property widgets 304*b* associated with settings 128 that can inherit from the currently selected setting 128'; and displays to the 'left' and 'right' of the currently selected widget 134' those property widgets 304*c* that can inherit (but are not currently inheriting) from the same settings as the currently selected setting 128'. Also shown in FIG. 3 are one or more inheritance indicators 306, such as a line or arrow, that connect each widget 134, 304 with any other widget 134, 304 that currently inherits its setting 128.

As best shown in FIG. 3*b*, when an user selects one of the property widgets 304, the inheritance manager 132 replaces the selected property widget 304 with its associated control widget 134, complete with its associated current value widget 202 and inheritance indicator icon 204, and reduces the old currently display widget 134 into a property widget 304. As best shown in FIG. 3*c*, the user can then change the inheritance relationship of the newly selected display widget 134' by selecting and dragging the appropriate inheritance line 306 so that it interconnects the appropriate widgets 134, 304.

Figure 3D:
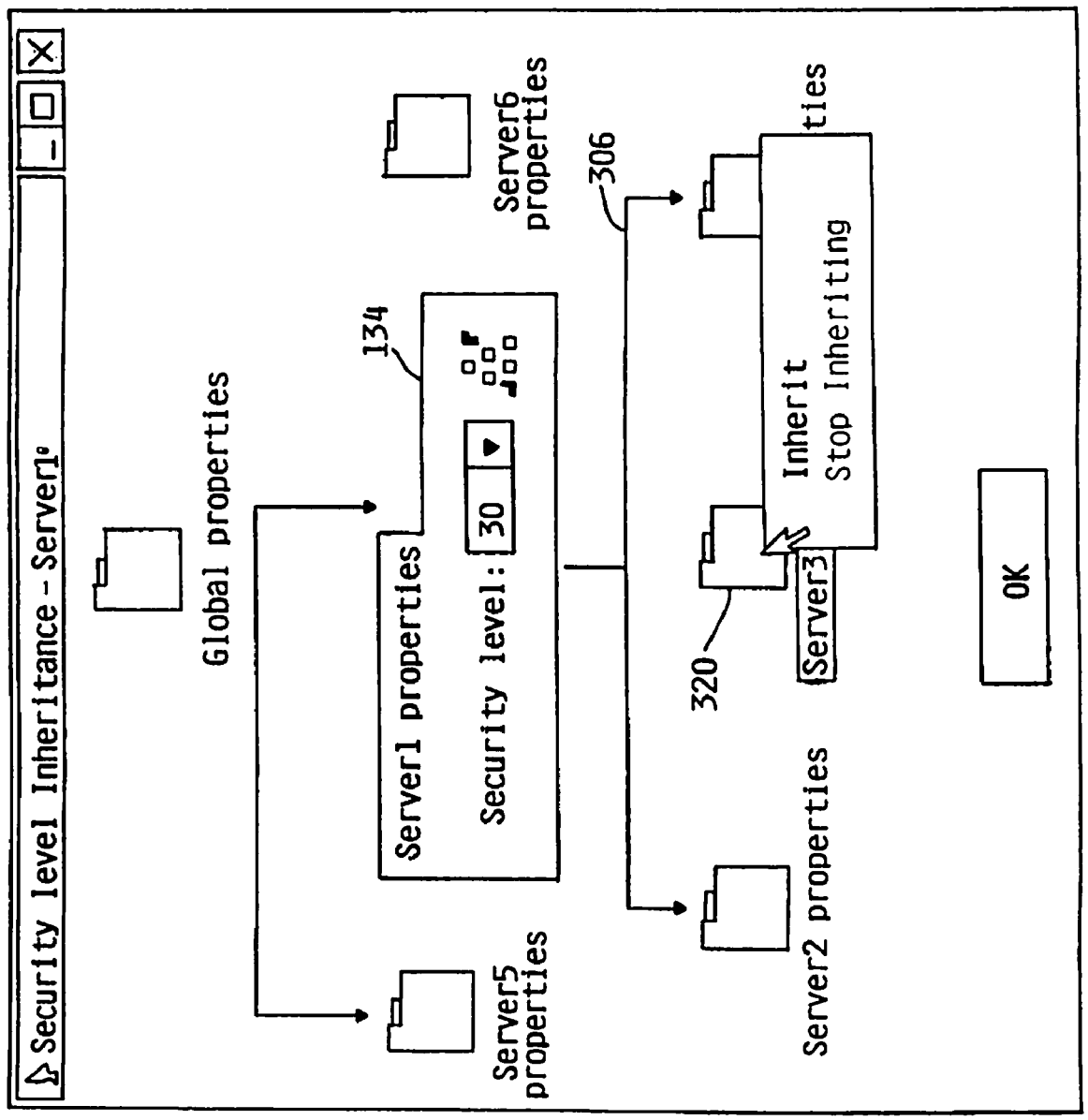

As best shown in FIG. 3*d*, the user can delete an inheritance relationship in this embodiment by 'right clicking' the appropriate inheritance indicator 306', which causes the inheritance manager 136 to display a context-sensitive pop-up menu. The user can then select "delete" from the context-sensitive pop-up menu, which causes the configuration manager 132 to eliminate the inheritance relationships between the two settings 128 that were previously connected by the selected inheritance connector 306'. Users can also delete inheritance relationships in this embodiment by selecting and dragging an inheritance indicator 306' away from a property widget 304. Thus, as best shown in FIG. 3*c*, as the inheritance indicator 306' is dragged from Server2 to Server3, the "security level" setting for Server2 automatically changes to "10" (the default setting).

With continuing reference in FIG. 3*d*, if a user changes the setting 128 in one of the control widgets, e.g., 304*b*, the configuration manager 132 automatically breaks the inheritance relationship with the selected display widget 134 because the settings 128 now differ. The inheritance indicators 306 are then immediately and automatically updated by the inheritance manager 136. These embodiments also immediately and automatically update all instances 126 of the application that inherit from that changed setting 128, and highlight the associated widgets 134, 304 to indicate that they recently changed. These embodiments are desirable because they provide the user with instant feedback about what their actions accomplished. In a highly functional user interface embodiments, the inheritance indicators 306 could be also be animated to reflect the changes are being propagated to each instance 126.

The user in this embodiment can select multiple control widgets 304 and then change the inheritance relationships for all of the items in the group. One suitable method to add inheritance to all of the selected items is to hold the "control" key while selecting the desired property widgets 304, followed by right-clicking on one of the selected widgets 304 and by selecting "Inherit" from the resulting pop-up context menu. The IT administrator can also use this procedure to remove inheritance relationships from a group of widgets 304.

When the IT administrator is finished managing the inheritance of a setting 128', he can then click "OK" from an appropriate menu. The inheritance manager 136 will then close, and the configuration manager 132 will then apply the changes will be applied across all the affected instances 126 and will return the IT administrator to the location from which he or she invoked the configuration manager 132.

Figure 4:
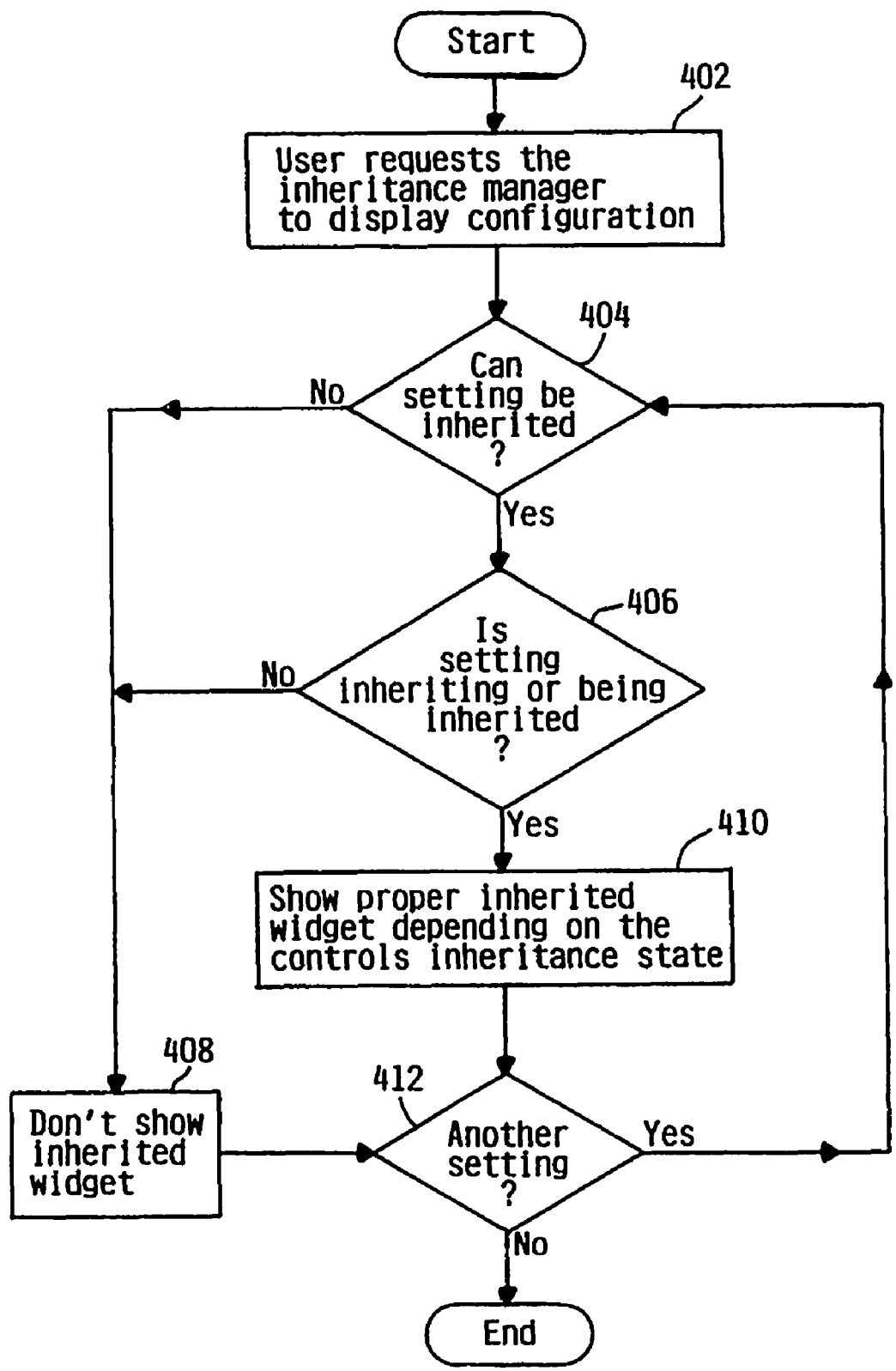
FIG. 4 illustrates one method of visually tagging a setting using configuration manager embodiment in FIGS. 3a-3d.

FIG. 4 illustrates one method of visually tagging each setting 128 using the configuration manager 136 so that the IT administrator can know at a glance whether the setting 128 can inherit from a global setting, if it is currently inheriting its value, and/or if another setting 128 is currently inheriting from it. In this embodiment, these acts are performed for each widget before the page is initially displayed. At block 402, the IT administrator requests the configuration manager 132 to display the current configuration in the inheritance manager 136. At block 404, the configuration manager 132 determines whether or not each setting can be inherited. If the setting 128' can not be inherited, the inheritance manager 136 indicates this condition using, for example, the inheritance indicator icon 204 shown in FIG. 2*b*. If the setting 128 can be inherited, the configuration manager 132 determines (at block 406) whether or not the setting 128' is currently being inherited by or is currently inheriting from another setting 128. The configuration manager 132 then connects (at block 408) those settings 128 using the configuration indicators 306 described with reference to FIGS. 3*a*-3*b* One suitable way to determine and track the inheritance state for a setting 128 is to embed tags into a configuration file that contains the setting 128. The tag in one such embodiment comprises an 2-bit number (i.e., an integer between 0-3), where '0' indicates that the setting is not able to inherit; '1' indicates that the setting can inherit but is not currently inheriting; '2' indicates that the setting 128 is currently inheriting from a global setting or the like; and '3' indicates that a lower setting is currently inheriting from the current setting. At block 412, he configuration manager 132 determines if there are any more settings to display and repeats blocks 404-410 if necessary.

Figure 5:
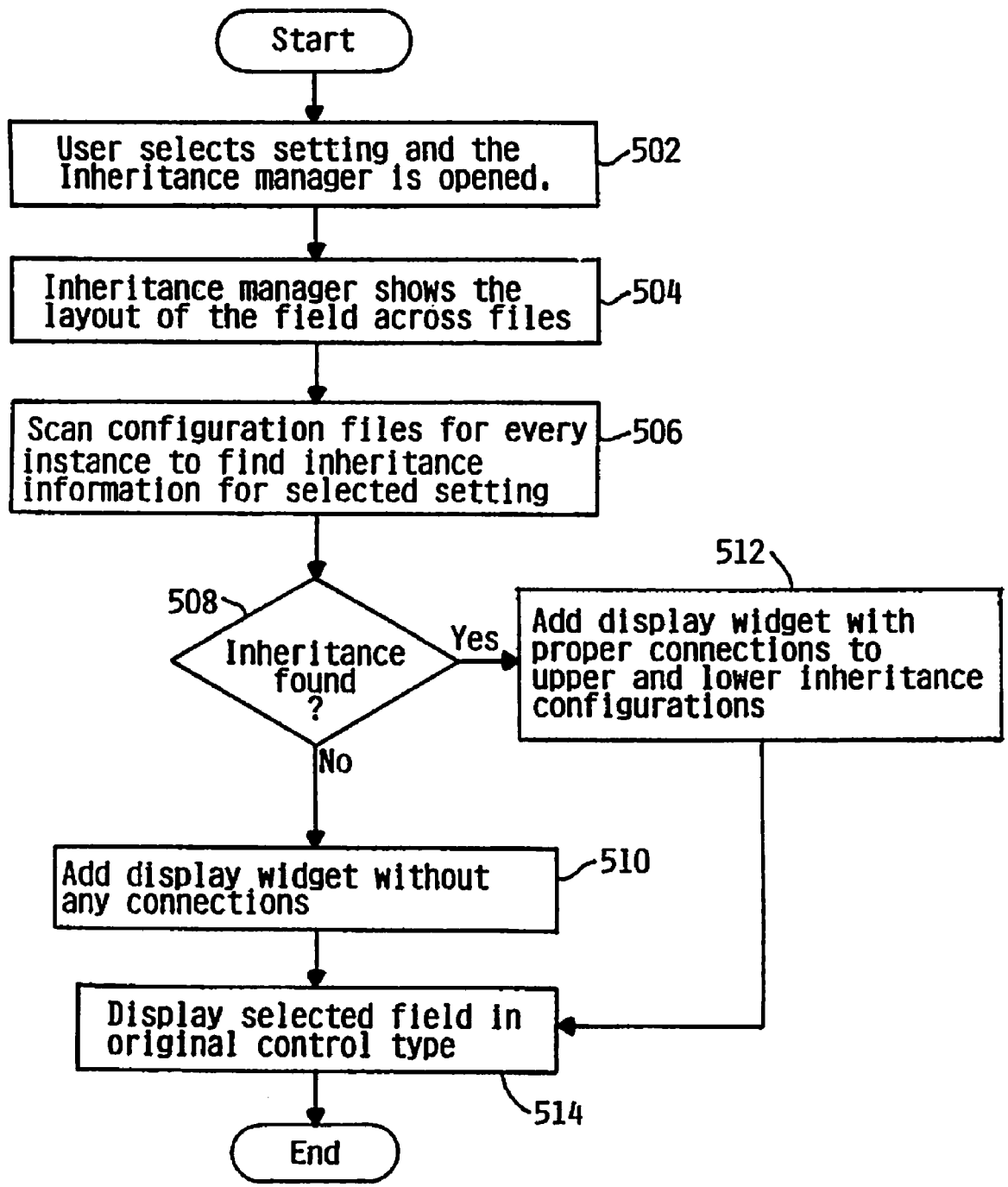
FIG. 5 illustrates one method of managing the inheritance of a setting using the configuration manager embodiment in FIGS. 1-3.

FIG. 5 illustrates one method of managing the inheritance of a setting 128 in more detail. At block 502, the IT administrator selects a display widget 134, which causes the configuration manger to open the inheritance manager 136. At block 504, the inheritance manager displays the layout of the setting 128 across every instance 126 of the application. At blocks 506-508, the inheritance manager 136 scans all the configuration files for every instance 126 of the application to find inheritance information for a selected setting 128. If the inheritance manager 136 finds an inheritance relationship, the inheritance manger 136 indicates the relationship (at block 512) using, for example, the inheritance indicators 306 described with reference to FIG. 3*b*. If the inheritance manager 136 does not find an inheritance relationship for the selected setting 128, it adds a displays a display widget 134 at block 510. Next, at block 514, the inheritance manager displays the selected field in the original control type. The original control type may be received from the user interface and/or operating system that launched the inheritance manager 136. In one embodiment, this information is described and communicated using XML. This markup language is desirable because it allows widgets to be setup and rendered within a variety of applications. This, in turn, allows the present invention to present the inherited values to the administrator using their familiar control type (i.e., complex table, graph, custom widget, check box, or simple edit box). However, other communication and description protocols, such as HyperText Markup Language ("HTML"), User Interface Markup Language ("UIML"), XML User-interface Language ("XUL"), and other user interface markup languages, are also within the scope of the present invention. If it cannot be automatically detected, the developer has the option of providing a custom control to input into the Inheritance Manager.

Figure 6:
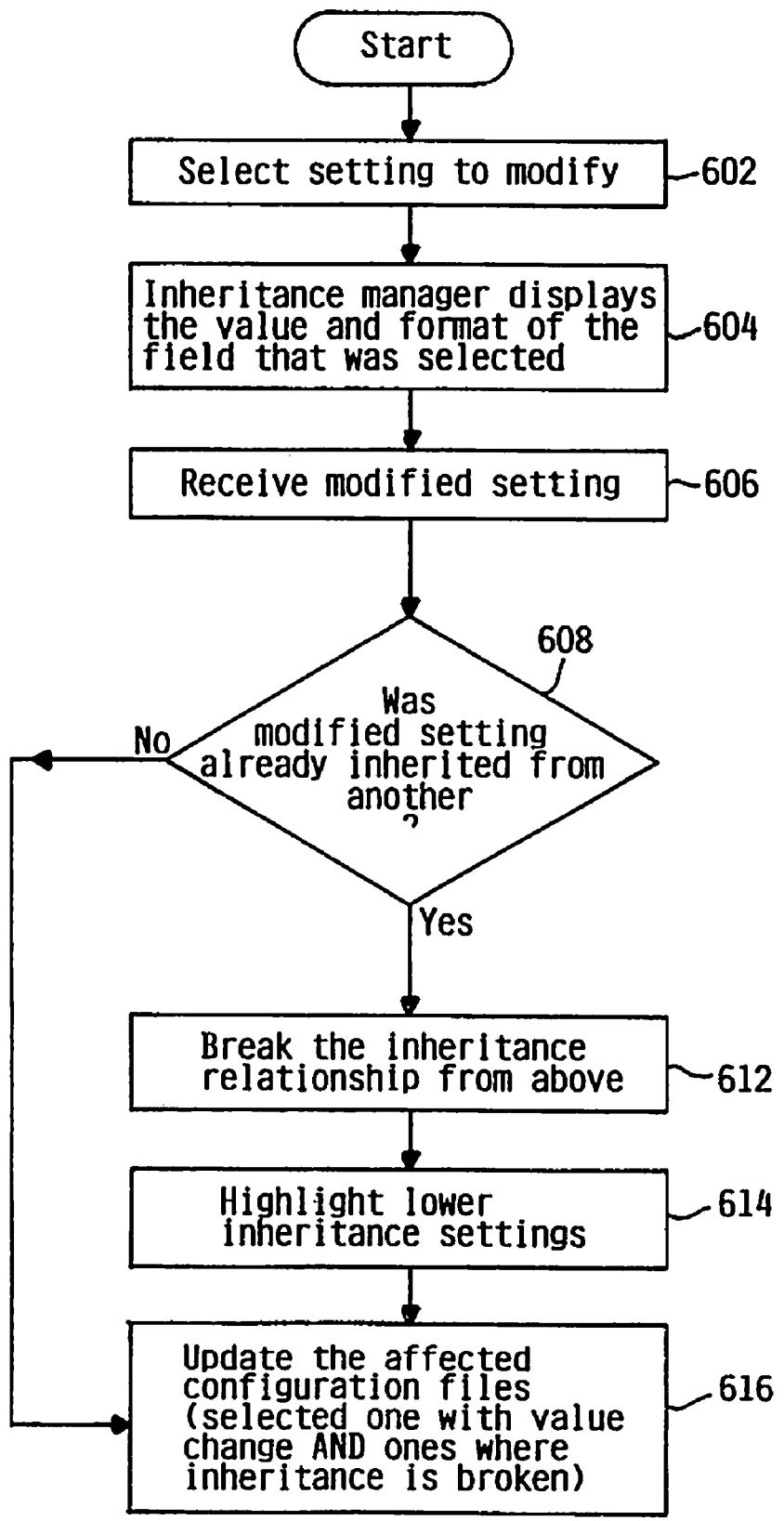
FIG. 6 illustrates one method of modifying a setting within the inheritance manager embodiment in FIGS. 1-3.

FIG. 6 illustrates one method of modifying a setting 128 within the inheritance manager. In this embodiment, the IT administrator has the ability to modify a value of any of the fields displayed in the inheritance manager 136 by selecting the associated display widget 134 and then changing the setting in the resulting control 202. The setting 128 will show up in its familiar format (i.e., table, edit box, check box) and will be updated directly from the inheritance manager 136. One feature and advantage of this embodiment is that there is no need for the IT administrator to exit out of the configuration manager 132 and open a new user interface window just to change a setting 128. Accordingly, at block 602, the IT administrator selects a property widget 304' associated with the setting 128' that he wants to modify. This action causes the inheritance manager 136 to display (at block 604) a display widget 134 containing a control 202 for the setting 128. At block 606, the IT administrator modifies this setting 128' using the control 202. At block 608, the inheritance manager 136 determines whether the selected setting 128' was previously inheriting from another setting 128. If so, at block 612, the inheritance manager 136 breaks the inheritance relationship from above because the setting 128' was just overridden and indicates the new relationship by deleting the inheritance indicators 306 (e.g. modifying a property indicates an implicit desire to change inheritance). Next, at block 614, the inheritance manager 136 highlights the property widgets 306 associated with any setting that inherit from the modified setting 128 and proceeds to block 614. At block 616, the inheritance manager 136 updates the affected configuration files with the new inheritance settings (i.e., the setting 128' that was manually changed, the setting 128 from which the selected setting 128' previously inherited, and the setting(s) 128 that inherited from the selected setting 128' and have now been modified).

Figure 7A:
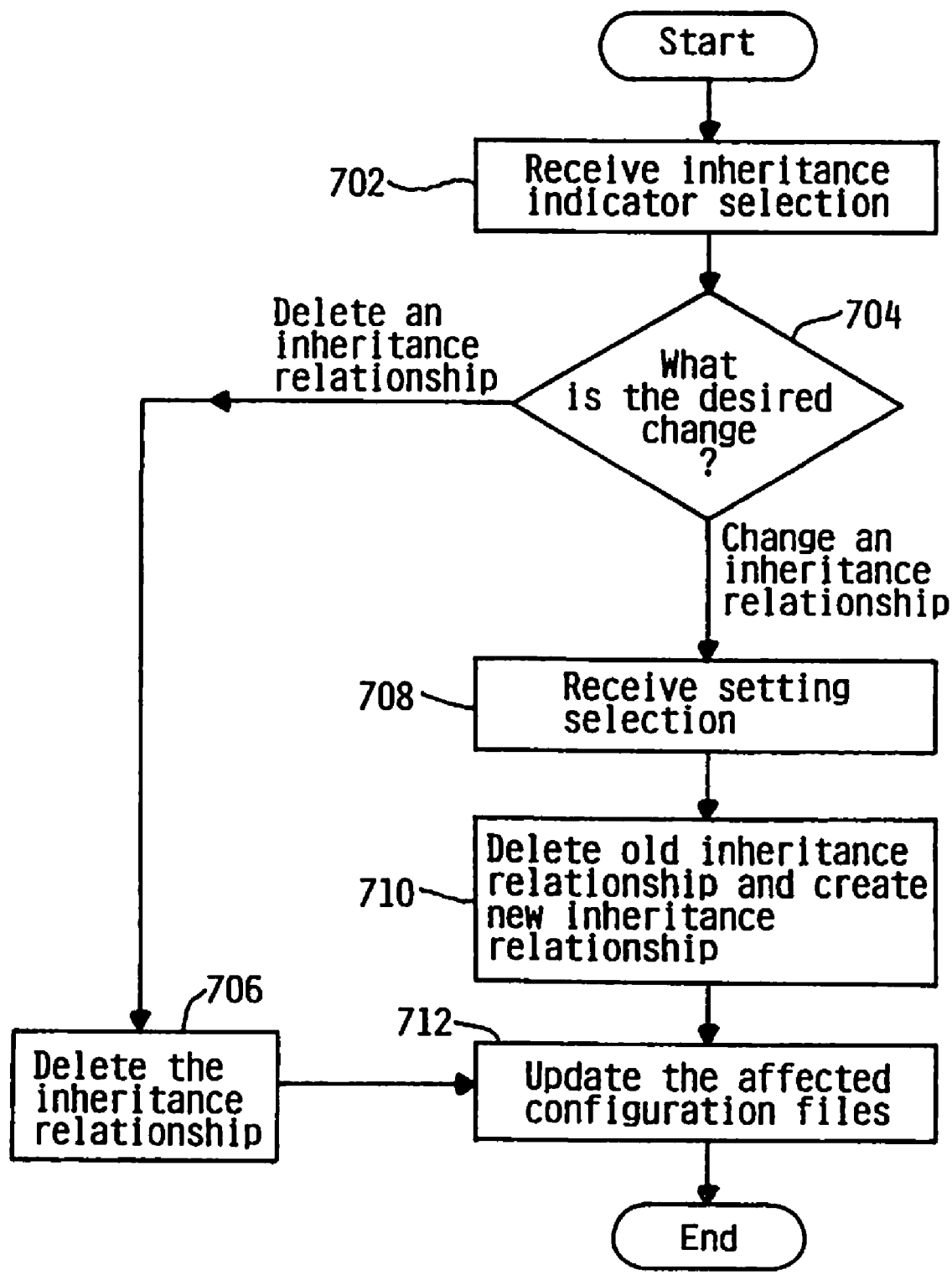
FIGS. 7a-7c illustrate three methods of modifying inheritance using the configuration manager embodiment in FIGS. 1-3.
Figure 7B:
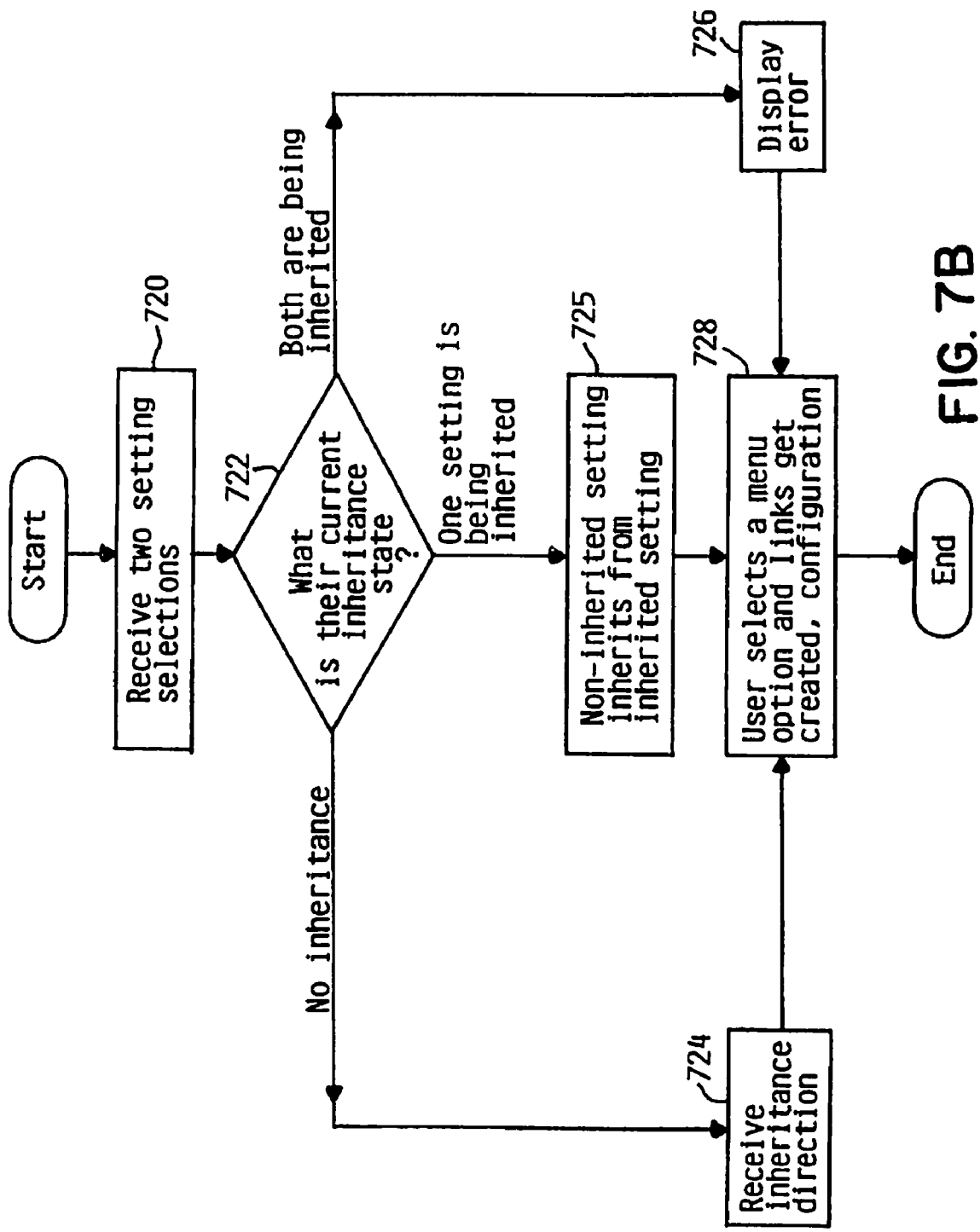
Figure 7C:
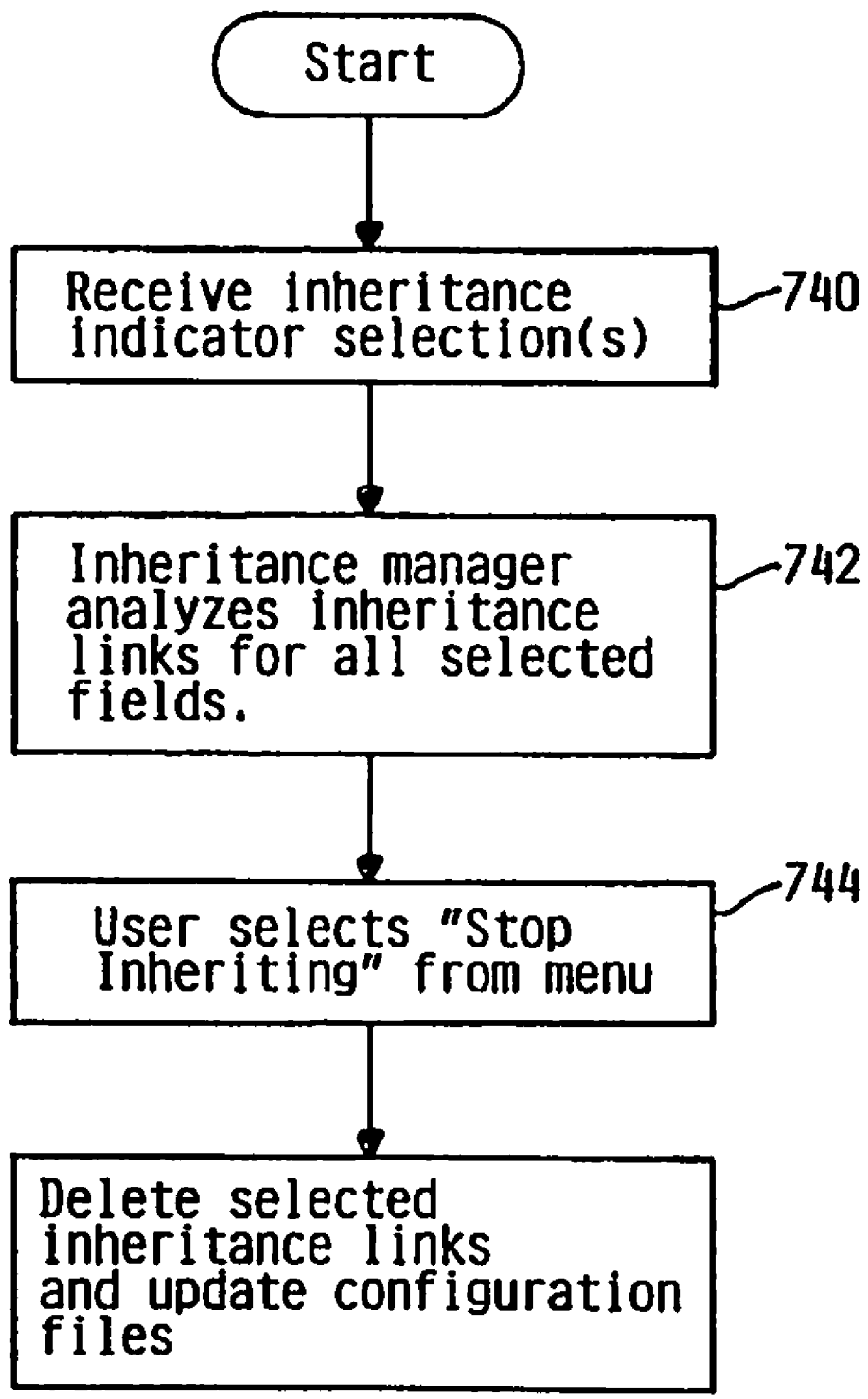

FIGS. 7a-7c illustrate methods of modifying inheritance in this embodiment. More specifically, FIG. 7a illustrates one method of modifying modify inheritance through direct manipulation of inheritance indicators 306. At block 702, the IT administrator selects an inheritance indicator 306 connecting two settings 128. At block 704, the inheritance manager 136 displays a context-sensitive 'right-click' menu to the IT administrator and receives a desired operation selection. If the user requested a delete operation, the inheritance manager 136 deletes the inheritance indicator 306 from the view (at block 706). The configuration manager 132 then updates the affected configuration files at block 712. If the IT administrator requested a change inheritance operation at block 704, the inheritance manager 136 (at block 708) waits for the IT administrator to identify a new setting 128" and then (at block 710) deletes the old inheritance indicator 306 and creates a new inheritance indicator 306 to the new setting 128". Any setting(s) 128 that are no longer inheriting from any of the selected settings 128' can be changed to a default value or can remain at their current value, which ever the IT administrator prefers.

FIG. 7b illustrates one method of modifying inheritance by selecting display widgets. At block 720, the IT administrator selects two settings 128'. At block 722, the configuration manager 132 determines the current inheritance state for the two selected settings 128'. If neither of the settings 128' is currently inheriting or being inherited, the inheritance manager 136 displays a context sensitive menu to the IT administrator at block 724 asking which of the selected settings 128' should inherit and which should be inherited (e.g., 'Instance003 inherit from Instance004' or 'Instance004 inherit from Instance003'). Next, at block 728, the configuration manager 132 updates the configuration files and the inheritance manager 136 creates a new inheritance indicator 306. If exactly one of the settings 128 selected at block 720 is being inherited, the inheritance manger 136 automatically causes the 'non-inherited' server to inherit from the 'inheriting' server (at block 725). If both of the settings 128 selected at block 720 are currently being inherited, the inheritance manager 136 does not create any new links and may display an error message (at block 726).

FIG. 7c illustrates one method of deleting inheritance links. At block 740, the user selects one or more inheritance indicators 306. At block 742, the configuration manager 132 determines the current inheritance state for every setting 128 interconnected by the selected inheritance indicators 306'. Next, at block 744, the inheritance manager 136 displays a context sensitive menu to the IT administrator containing an option to 'stop inheriting.' After the IT administrator selects the stop inheriting option, (at block 746) the configuration manager 132 updates the configuration files for the settings to indicate the changed inheritance state and the inheritance manager 136 removes the selected inheritance indicators 306'.

In all three methods illustrated in FIGS. 7a-7c, when the IT administrator is done managing the inheritance of a particular setting 128', the configuration manager 136 will automatically apply the changes across any instance(s) that inherit from the modified setting 128'. The configuration manager 132 will then close and the IT administrator will be returned to the initial place in the user interface from which he or she came, with all of the settings 128 updated.

Referring again to FIG. 1, the computer systems 102 in this embodiment utilizes well known virtual addressing mechanisms that allow the programs of the computer systems 102 to behave as if they only have access to a large, single storage entity instead of access to multiple, smaller storage entities such as main memory 112 and DASD device 140. Therefore, while the operating systems 124, the configuration manager 132, and the application program instances 126 are shown to reside in main memory 112, those skilled in the art will recognize that these items are not necessarily all completely contained in main memory 112 at the same time, and may even reside in the virtual memory of other computer systems coupled to the computer system 600.

The central processing units 110 may be any device capable of executing the program instructions stored in main memory 112, and may be constructed from one or more microprocessors and/or integrated circuits. When one of the computer systems 102 start up, the CPU 110 initially execute the program instructions that make up the operating system 124, which manages the physical and logical resources of the computer system 102. These resources include the central processing unit 110, the main memory 112, the mass storage interface 114, the display interface 115, the network interface 116, and the system bus 122. Further, although each computer system 102 is shown to with only a single processing unit 110 and a single system bus 122, those skilled in the art will appreciate that the present invention may be practised using a computer system 102 that has multiple processing units 110 and/or multiple system buses 122. In addition, the interfaces 114, 115, 116, and 118 may each include their own separate, fully programmed microprocessors, which may be used to off-load compute-intensive processing from the main processing units 110.

The display interface 115 is used to directly connect one or more displays 180 to the computer system 102. These displays 180 may be non-intelligent (i.e., dumb) terminals or fully programmable workstations, and are used to allow IT administrators and users to communicate with computer system 102. Note, however, that while the display interface 115 is provided to support communication with one or more displays 180, the computer system 102 does not necessarily require a display 180 because all needed interaction with users and other processes may occur via network interface 116.

The communication medium 106 can be any device or system that allows the computer systems 102 to communicate with each other. The network interfaces 116, accordingly, can be any device that facilitates such communication, regardless of whether the network connection is made using present-day analog and/or digital techniques or via some networking mechanism of the future. Suitable communication mediums 106 include, but are not limited to, the Internet, intranets, cellular transmission networks, wireless networks using the IEEE 802.11 specification, and the like. Those skilled in the art will appreciate that many different network protocols can be used to implement the communication medium 106. The Transmission Control Protocol/Internet Protocol ("TCP/IP") is an example of a suitable network protocol for Internet communication.

The embodiment described with reference to FIGS. 1-7 generally uses a client-server network architecture. These embodiments are desirable because the management computer systems 102a can utilize the service of the managed computer systems 102b without either computer system 102 requiring knowledge of the working details about the other. However, those skilled in the art, will appreciate that other network architectures are within the scope of the present invention. Examples of other suitable network architectures include peer-to-peer architectures, grid architectures, and three-tier architectures.

One suitable management computer system 102a is an eServer™ iSeries® computer running the OS/400® multitasking operating system, both of which are produced by International Business Machines Corporation of Armonk, N.Y. One suitable managed computer system 102b is an eServer™ Bladecenter computer running the Linux™ operating system. However, those skilled in the art will appreciate that the mechanisms and apparatus of the present invention apply equally to any computer system 102 and operating system 124, regardless of whether the computer system 102 is a complicated multi-user computing apparatus, a single workstation, embedded control system. The present invention applies and its inheritance manager 136 may be used to manage any device capable of processing information, including without limitation, pervasive computing devices, such as cellular telephones, personal digital assistants ("PDA"), and the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of signal bearing media used to actually carry out the distribution. Examples of suitable signal bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive, a CD-R disk, a CD-RW disk, or hard-disk drive); or (iii) information conveyed to a computer by a communications medium, such as through a computer or telephone network, including wireless communications, and specifically includes information downloaded from the Internet and other networks. Such signal-bearing media, when carrying computer-readable instructions that direct the functions of the present invention, represent embodiments of the present invention. Also, although the present invention was generally described as a stand-alone management system, it may also be integrated in whole or in part into the operating system 124 of the computer system 102, and may be may be used advantageously with converged user interfaces and/or in heterogeneous environments. In addition, although the present invention has been described with reference to managing individual settings 128, those skilled in the art will appreciate that IT administrators could use the configuration manager to manage groups of settings simultaneously by, for example, using the control widgets to select a configuration file.

The present invention offers numerous advantages over conventional computer management systems. For example, the those skilled in the art will appreciate that the present invention and its inheritance manager 136 is desirable because it provides the IT administrator with instant access to all instances of the same setting 128 in order to manage both the setting and its inheritance properties. This, in turn, allows the IT administrator to: (i) instantly see if a particular instance 126 of the application program is inheriting from another setting (global or otherwise); (ii) instantly edit the selected setting 128'; (ii) edit from where the setting 128' inherits its value; and (iv) edit what other settings 128 inherits from the currently selected setting 128'. The present invention and its control widgets 134 are also desirable because they allow the IT administrator to edit the selected setting 128' in its original control, which allows for consistency and improves usability. That is, if the user interface normally displays the setting as part of a list a drop down menu, the display widget 134 also shows the setting 128' as a drop-down menu. In addition, the present invention is desirable because it can allows the IT administrator to easily determine from where a setting 128 inherits and easily link to that location.

Those skilled in the art will appreciate that the present invention may be used to manage information other than application settings. For example, some embodiments may be used in conjunction with identity management software, such as the Enterprise Identity Mapping ("EIM") software described in U.S. patent application Ser. No. 09/818,064, filed Mar. 21, 2001, which is herein incorporated by reference in its entirety. In these embodiments, the configuration manager 132 could be used to show which enterprise identity a particular user profile inherits from, as well as creating relationships between a profile and an identity. Other embodiments may be used to manage intelligent agents. The configuration manager 132 in these embodiments could be used to display and manage the working relationship between agents (e.g., which agents are controlling other agents, which agents are being controlled).

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Therefore, it is desired that the embodiments described herein be considered in all respects as illustrative, not restrictive, and that reference be made to the appended claims for determining the scope of the invention.

We claim:

1. An inheritance manager for an IT system, comprising:
a memory device communicatively coupled to a processor;
data stored in the memory representing configurations of a plurality of executing instances of an a managed application program, wherein each configuration comprises a plurality of settings; and
a control widget executing on the processor, the control widget associated with a selected setting for a selected one of the executing instances, the control widget comprising an inheritance relationship indicator and a current value indicator for the selected setting,
wherein the inheritance relationship indicator displays an inheritance relationship between a selected setting and at least one other setting, and
wherein the current value indicator displays a current value for the selected setting for the selected one of the executing instances using a control type used by a the managed application for the selected setting.

2. The inheritance manager of claim 1, further comprising a property widget associated with the at least one other setting.

3. The inheritance manager of claim 2, wherein the inheritance relationship indicator comprises a graphical connector connecting the control widget to the property widget.

4. The inheritance manager of claim 3, wherein the relative positions of the control widget and the property widget indicate an inheritance relationship between the selected setting and the at least one other setting.

5. The inheritance manager of claim 3, wherein the graphical connector of the inheritance state indicates at least one state chosen from the group consisting of: the selected setting can inherit or be inherited, and the selected setting cannot inherit or be inherited.

6. A computer program product, comprising:
(a) a program configured to perform a method for managing settings in a computer system, the method comprising:
detecting configurations associated with a plurality of instances of an executing application, wherein each configuration comprises a plurality of settings;
receiving a setting selection from among the plurality of settings;
determining an inheritance state for the selected setting;
displaying a control widget associated with the selected setting for one instance of the application, the control widget comprising an inheritance state indicator and a current value indicator; wherein a current value is displayed using a control type used by a managed application for the selected setting;
displaying an inheritance relationship indicator that indicates the inheritance relationship between the selected setting and at least one other setting;
selecting the control widget associated with a desired setting for at least one of the plurality of instances of the application;
modifying the current value for the desired setting; and
modifying the inheritance state for the desired setting;
(b) a computer readable storage media bearing the program.

7. The computer program product of claim 6, wherein the computer readable storage media is chosen from the group consisting of: a non-rewritable storage media and a rewritable storage media.

8. The computer program product of claim 6, wherein the graphical indication of the inheritance state indicates at least one state chosen from the group consisting of: the selected setting can inherit or be inherited, and the selected setting cannot inherit or be inherited.

9. The computer program product of claim 6, further comprising displaying a graphical indication of the inheritance relationship between the selected setting and at least one related setting.

10. The computer program product of claim 9, wherein the at least one related setting comprises a setting that is not currently in an inheritance relationship with the selected setting.

11. The computer program product of claim 9, wherein the graphical indication of the inheritance relationship comprises an inheritance indicator.

12. The computer program product of claim 9, wherein the method further comprises:
receiving a change inheritance relationship command; and
changing the inheritance relationship for the selected setting.

13. The computer program product of claim 12, further comprising determining whether changing the inheritance relationship for the selected setting will affect other settings.

14. The computer program product of claim 6, wherein the method further comprises:
receiving a change inheritance state command; and
changing the inheritance relationship for the selected setting.

15. The computer program product of claim 14, wherein the method further comprises determining whether changing the inheritance relationship for the selected setting will affect other settings.

16. The computer program product of claim 15, wherein the method further comprises updating the other settings.

17. A computer program product, comprising:
(a) a program configured to perform a method for managing settings of applications executing on a computer system, the method comprising:
detecting configurations associated with a plurality of instances of an executing application, wherein each configuration comprises a plurality of settings;
receiving a setting selection from among the plurality of settings;
determining an inheritance state for the selected setting;
displaying a control widget associated with the selected setting for one instance of the application, the control widget comprising an inheritance state indicator and a current value indicator, wherein the current value is displayed using a control type used by a managed application for the selected setting, and wherein the inheritance state indicator indicates at least one state chosen from the group consisting of: the selected setting is inherited by another setting, the selected setting is inheriting from another setting, the selected setting is both inheriting from another setting and is being inherited by another setting, and the selected setting is not inheriting or being inherited;
displaying an inheritance relationship indicator that indicates the inheritance relationship between the selected setting and the at least one other setting;

selecting the control widget associated with a desired setting for at least one of the plurality of instances of the application;
modifying the current value for the desired setting; and
modifying the inheritance state of the desired setting;
(b) a computer readable storage media bearing the program.

18. The computer program product of claim 17, wherein the computer readable storage media is chosen from the group consisting of: a non-rewritable storage media and a rewritable storage media.

* * * * *